United States Patent [19]

Sakai

[11] Patent Number: 4,578,049
[45] Date of Patent: Mar. 25, 1986

[54] PULLEY DEVICE
[75] Inventor: Yoshitaka Sakai, Nagoya, Japan
[73] Assignee: Sakai Manufacturing Co., Ltd., Nagoya, Japan
[21] Appl. No.: 703,573
[22] Filed: Feb. 20, 1985
[30] Foreign Application Priority Data
   Sep. 18, 1984 [JP] Japan ................. 59-195076
[51] Int. Cl.⁴ .......................................... F16H 55/56
[52] U.S. Cl. ............................................ 474/8; 474/43
[58] Field of Search ............... 474/8, 11, 12, 17, 28, 474/43–46

[56] References Cited
U.S. PATENT DOCUMENTS
3,516,295  6/1970  Benz et al. ................ 474/43 X
3,705,517 12/1972  Yamanaka et al. ......... 474/43 X
4,075,902  2/1978  Charchian et al. ............ 474/44
4,149,425  4/1979  Williams ....................... 474/44

Primary Examiner—Stephen J. Novosad
Assistant Examiner—Thuy M. Bui
Attorney, Agent, or Firm—Pollock, Vande Sande & Priddy

[57] ABSTRACT

A pulley device comprises a pair of discs both slidably mounted onto a driving shaft and urged by the respective coil springs, three roll pins provided in the respective discs and extending radially, and a pair of end members each having a cylindrical portion in which three axial notches are formed for receiving the roll pins. These roll pins are borne in the openings of the discs by means of the oilless bearings disposed therein for a rotation about the axis of the roll pin and for a slidable movement along the axis thereof.

5 Claims, 3 Drawing Figures

PULLEY DEVICE

BACKGROUND OF THE INVENTION

1. Field of the Invention

The present invention relates to a pulley device, and more particularly to a pulley device incorporated in a V-belt driven transmission apparatus used in an automobile or a machine tool.

2. Description of the Prior Art

A pulley device has been generally used, in which an axially stationary disc having a centre opening is fixed onto a driving shaft through the centre opening of the stationary disc, and a movable disc having a centre opening is axially slidably mounted onto the driving shaft through the centre opening of the movable disc and opposes the stationary disc so as to define therebetween an annular groove for a driving belt. There are elongated elastic members, each having a abrasion resistivity, interposed between the inner peripheral surfaces of the openings of the discs and the outer periphery of the driving shaft. The ball-bearings are disposed between the elongated elastic members as rotation keys so as to facilitate a relative axial movement of the discs. Such prior pulley device is disclosed in Japanese patent publication No. 17504/61 (Japanese Pat. No. 277,496).

In these prior devices, since one disc is movable and the other is stationary, the urging pressure acting onto one end surface of the driving belt is not equal to one acting onto the other end surface of the driving belt, so that the torque transmission loss is increased. Furthermore, the driving torque is transmitted from the driving shaft to the discs through the elastic members and then a part of the driving torque is consumed in straining such elastic members, so that the torque transmission loss is substantially increased.

SUMMARY OF THE INVENTION

Accordingly one object of the present invention is to provide a pulley device having an improved torque transmissibility and an improved durability as well as having a simple structure thereof.

To this end, according to the present invention, a pair of axially movable discs are mounted slidably onto the driving shaft so that each of the discs is urged toward the other one by means of the respective urging means to hold the driving belt therebetween. At least one roll pin is provided in each of the discs. The roll pin extends radially through aligned bores formed on concentric tubular portions of the disc and is borne by means of oilless bearings disposed within the aligned bores. Accordingly the roll pin can rotate about the axis thereof and move along the axis thereof. Such roll pin is prevented from excessively moving in the aligned bores along the axis thereof with a rotation about an axis thereof and is guided within a notch formed in a cylindrical portion which is fixed to the driving shaft and is accommodated in an annular space defined by the concentric tubular portions.

In the present invention, a pair of discs are urged so as to close to each other by means of the urging means, respectively, so that the urging pressures acting onto the opposite end surfaces of the driving belt are equal to each other and uniform. Accordingly the slip between the driving belt and the pulley device is prevented and then the torque transmission loss is decreased. Furthermore, an axial impact and a oscillated force acting onto the roll pins are absorbed by the oilless bearings disposed within the aligned bores formed on the concentric tubular portions, so that the mechanical frictional force is prevented as well as the simple construction can be obtained.

The foregoing and other objects of the present invention will be apparent from the following description in connection with the preferred embodiment.

DETAILED DESCRIPTION OF THE PREFERRED EMBODIMENTS

Figure 1:
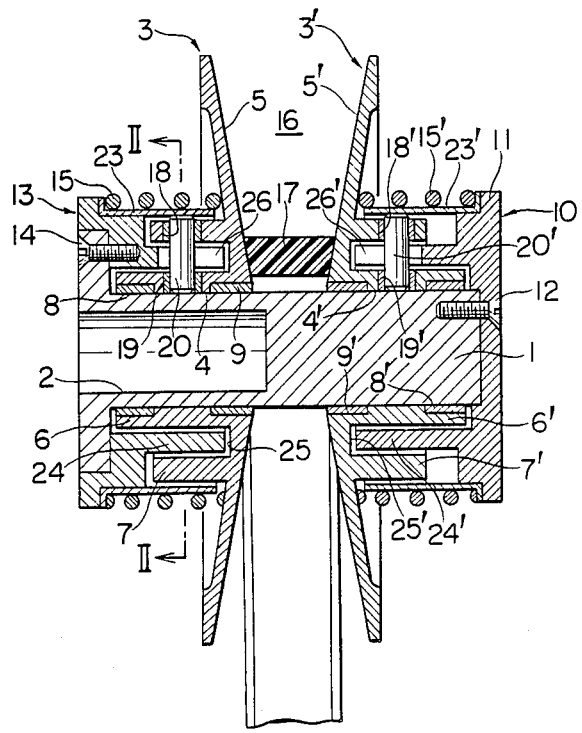
FIG. 1 is a sectional view of an embodiment of the pulley device according to the present invention.

In FIG. 1, the reference numeral 1 designates a driving shaft provided with an axial bore 2 into which an output shaft of the motor or a driven shaft of the machine is to be tightly inserted. A pair of discs 3, 3' are slidably mounted onto the driving shaft 1 through centre openings 4, 4' of the discs. Each of the discs 3, 3' has the same form to each other and is provided at one end thereof with a truncated cone surface 5 or 5'. Concentric tubular portions 6, 7 or 6', 7' project from the other end of the disc 3 or 3'. The axes of the tubular portions 6, 7 (or 6', 7') are concentrated upon the axis of the disc 3 or 3'. Two bushings 8, 9 or 8', 9' are interposed at opposite end portions of the respective inner tubular portions 6, 6' between an inner periphery thereof and an outer periphery of the driving shaft and are fixed to the inner periphery of the tubular portions 6, 6'.

A cup shaped end member 10 having a flange portion 11 is fixed to one end of the driving shaft 1 by means of screws 12 (only one of them is shown). To the other end of the driving shaft 1 a stepped cylindrical end member 13 is also fixed by means of screws 14. The end member 10 or 13 and the driving shaft 1 may be incorporated within a one piece element. These members 10 and 13 serve as spring receivers. There is disposed a coil spring 15 or 15' between the other end of the disc 3 or 3' and the end member 10 or 13. The coil spring 15 or 15' urges one disc toward the other one to bring them close to each other so as to define between the truncated cone surfaces of the discs an annular groove 16 for a driving belt 17. The driving belt 17 is forcedly held at the opposite ends thereof by two discs 3, 3' so as to transmit the torque from the motor to the machine.

Figure 2:
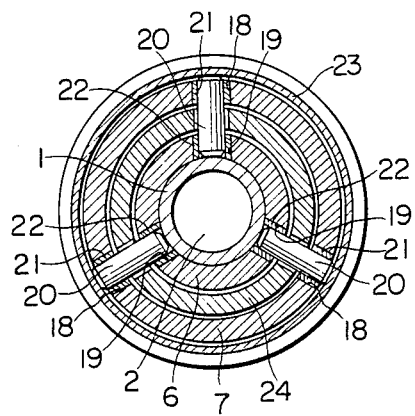
FIG. 2 is a cross sectional view of the pulley device shown in FIG. 1 taken along the line II—II thereof.

As shown in FIGS. 1 and 2, three equiangularly spaced bores 18 or 18' are formed on the peripheral wall of the radial outer tubular portion 7 or 7' and three equiangularly spaced bores 19 or 19' are formed on the peripheral wall of the radial inner tubular portion 6 or 6'. The associated bores 18, 19 or 18', 19' are radially aligned to each other and three roll pins 20 or 20' are inserted through the aligned bores 18, 19 or 18', 19'. Oilless bearings 21, 22 or 21', 22' are interposed between inner peripheries of the bores 18, 19 or 18', 19' and the outer periphery of the roll pin 20 or 20', and are fixed to the inner peripheries of the bores, respectively, so that the roll pins 20, 20' are able to rotate about and slide along the respective axis thereof. The term "oilless" is used in the present application to mean the materials having a self-lubricating nature. The movement of the roll pin 20 or 20' along the axis thereof is restricted by means of a thin wall cylinder 23 or 23' which is fixed to the outer peripheral portion of the end member 10 or 13 and retains the respective coil springs 15, 15'.

The end member 10 or 13 is provided with a cylindrical portion 24, 24' projecting axially outwardly from one end surface thereof. The cylindrical portion 24 or 24' is so located that it is able to be inserted into an annular space 25 or 25' defined by the concentric tubular portions 6, 7 or 6', 7'. The cylindrical portion 24 or 24' is provided at a peripheral wall thereof with three axial notches 26 or 26' which are equiangularly spaced to each other. Each of the notches 26, 26' has a circumferential width slightly greater than the diameter of the roll pin 20 or 20' for a rotation of the roll pin about the axis thereof. Accordingly each of the discs 3, 3' is axially slidable within the extent of a length equal to the length of the notch 26 or 26', and to the contrary has no relative rotation therebetween.

Figure 3:
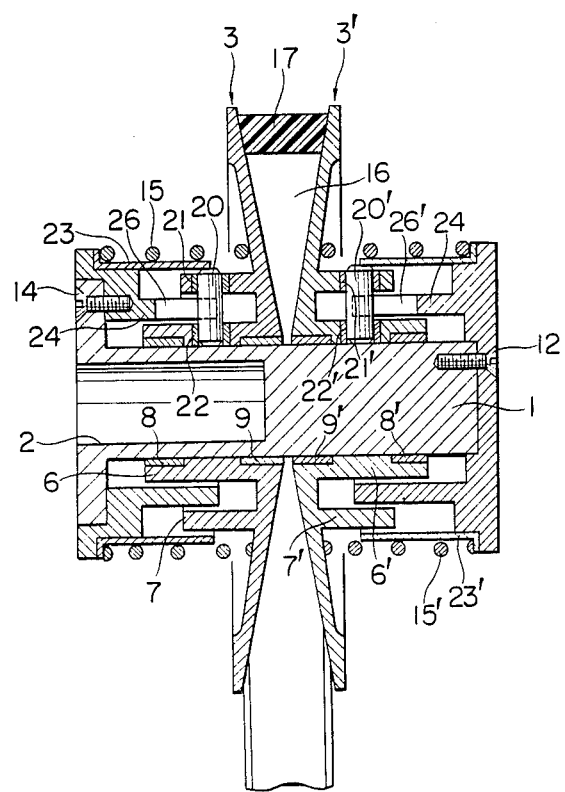
FIG. 3 is a sectional view of the pulley device shown in FIG. 1 in which an effective diameter thereof is changed.

The operation of the above mentioned pulley device will be described hereinafter. The discs 3, 3' are slidably moved along the axis of the driving shaft 1 to close to or apart from each other in order to change the driving belt speed (FIGS. 1 and 3). The driving belt 17 is located in a desired position and is forcedly held again between the discs 3, 3' by means of the coil springs 15, 15'.

According to the present invention, the discs can slidably and smoothly move along the axis of the driving shaft due to the presence of the oilless bearings on interfaces between the driving shaft and the discs. Furthermore, the roll pins are borne by means of the oilless bearings for a rotation about an axis thereof and for a movement along the axis thereof, so that the roll pins can move smoothly along the axis of the driving shaft within the extent of the notches of the cylindrical portions of the end members with rotating on their own axes and can also smoothly move along the respective axes thereof within the aligned bores of the concentric tubular portions. Accordingly, upon changing the belt speed, the heavy impact and the oscillated force acting onto the roll pins are substantially absorbed into the oilless bearings therefor and the speed change may be made readily and rapidly. No axial frictional force acting onto the roll pin is occurred. Consequently all rotating portions are lubricated by means of oilless bearings and then all axial movements of the roll pins can be made smoothly and readily.

Furthermore, a pair of discs are readily mounted onto the driving shaft means by making the roll pins housed in the aligned bores of the concentric tubular portions be received within the notches of the tubular portions of the end member. Accordingly, the pulley device according to the present invention becomes more simple in the constructions thereof, and then the assembling and deassembling operation of the pulley device is very readily made and the durability thereof is improved.

As described hereinbefore, according to the present invention, the urging pressures acting onto the respective end surface of the driving belt are equal to each other because both discs acting on the respective end surfaces of the driving belt are movable and the respective discs are urged by means of the separate urging means associated with the respective discs. Therefore no slip is occured between the driving belt and the discs and then the torque transmission loss is prevented.

Accordingly the present invention may be applicable to the machine or the device, such as a spindle speed change gear of the machine tool and an automobile transmission, which requires a rapid speed change, a high responsibility, a high uniformity of the spindle revolutions and so on. Furthermore the present invention is also applicable to the machine in which each section is electrically controlled by means of the control unit due to the high responsibility thereof.

What is claimed is:

1. A pulley device comprising:
   a driving shaft;
   a pair of discs each having a centre opening through which said disc is mounted on said driving shaft for slidable movement along an axis of said driving shaft, each of said discs being provided at one end thereof with a truncated cone surface and at the other end with concentric tubular portions, and axes of said concentric tubular portions being concentrated to an axis of said disc;
   at least a pair of roll pins each radially extending through aligned bores formed in peripheral walls of said concentric tubular portions of respective discs, said roll pin being restrained from a movement along an axis thereof;
   oilless bearing means interposed between an outer periphery of the respective roll pin and an inner periphery of said aligned bores in said concentric tubular portions for rotation of said roll pin about the axis thereof as well as for slidable movement of said roll pin along the axis thereof;
   a pair or urging means each interposed between said the other end of said disc and an end member fixed to said shaft, each of said urging means urging one of said disc toward the other one to define between said truncated cone surface thereof an annular groove for a driving belt; and
   a pair of cylindrical portions each fixed to said shaft and able to be loosely accommodated in an annular space defined by said concentric tubular portions of the respective discs, said cylindrical portion being provided at a peripheral wall thereof with at least one axial notch having a circumferential width substantially equal to a diameter of said roll pin for movement of said roll pin along the axis of said driving shaft.

2. A pulley device according to claim 1, wherein said urging means comprises an elastic member.

3. A pulley device according to claim 2, wherein said elastic member is a coil spring enclosing said concentric tubular members.

4. A pulley device according to claim 1, wherein three roll pins are spaced equiangularly to each other in a circumferential direction of said respective discs.

5. A pulley device according to claim 1, wherein said device further comprising oilless bearing means interposed between said centre opening of said disc and an outer periphery of said driving shaft.

* * * * *